(12) United States Patent
Shkolnikov et al.

(10) Patent No.: US 12,115,534 B2
(45) Date of Patent: Oct. 15, 2024

(54) NON-UNIFORM ELECTRICAL FIELD TO POSITION OBJECTS

(71) Applicant: Hewlett-Packard Development Company, L.P., Spring, TX (US)

(72) Inventors: Viktor Shkolnikov, Palo Alto, CA (US); Daixi Xin, Palo Alto, CA (US); Ken Ward, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 395 days.

(21) Appl. No.: 17/047,359

(22) PCT Filed: Jul. 26, 2018

(86) PCT No.: PCT/US2018/043795
§ 371 (c)(1),
(2) Date: Oct. 13, 2020

(87) PCT Pub. No.: WO2020/023038
PCT Pub. Date: Jan. 30, 2020

(65) Prior Publication Data
US 2021/0138453 A1 May 13, 2021

(51) Int. Cl.
*B01L 3/00* (2006.01)
*G01N 35/00* (2006.01)

(52) U.S. Cl.
CPC .......... *B01L 3/508* (2013.01); *B01L 3/5085* (2013.01); *G01N 35/0099* (2013.01); *B01L 2200/0668* (2013.01); *B01L 2300/0829* (2013.01); *B01L 2300/0851* (2013.01); *B01L 2300/12* (2013.01); *B01L 2400/0424* (2013.01)

(58) Field of Classification Search
CPC .......... B01L 3/508; B01L 3/5085; B01L 2200/0668; B01L 2300/0829; B01L 2300/0851; B01L 2300/12; B01L 2400/0424; B01L 2300/0645; G01N 35/0099
See application file for complete search history.

(56) References Cited

U.S. PATENT DOCUMENTS

| | | | |
|---|---|---|---|
| 6,969,449 | B2 | 11/2005 | Maher et al. |
| 7,276,206 | B2 | 10/2007 | Augustine et al. |
| 8,003,372 | B2 | 8/2011 | Klauke et al. |
| 8,372,629 | B2 | 2/2013 | Southern et al. |

(Continued)

FOREIGN PATENT DOCUMENTS

CA 2763114 1/2002

OTHER PUBLICATIONS

Y. Inoue, R. Obara, M. Nakano and J. Suehiro, "Concentration of bacteria in high conductive medium using negative dielectrophoresis," 2015 IEEE International Conference on Industrial Technology (ICIT), Seville, Spain, 2015, pp. 3336-3340 (Year: 2015).*

*Primary Examiner* — Benjamin R Whatley
*Assistant Examiner* — Peter Valentin Diaz
(74) *Attorney, Agent, or Firm* — Foley & Lardner LLP

(57) ABSTRACT

An example system includes a well plate having at least one well, an array of electrodes positioned on a surface of a bottom floor of the well, and a controller to direct electrical voltage to the electrodes to generate a non-uniform electrical field. The electrical field is to direct an object in the electrical field to a target position in the well.

12 Claims, 4 Drawing Sheets

(56) References Cited

U.S. PATENT DOCUMENTS

| | | | |
|---|---|---|---|
| 9,329,168 B2 | 5/2016 | Rajaraman et al. | |
| 9,588,105 B1 | 3/2017 | Hussain et al. | |
| 2002/0045159 A1 | 4/2002 | Maher et al. | |
| 2005/0266478 A1* | 12/2005 | Huang | B01L 3/502792 |
| | | | 438/1 |
| 2007/0212111 A1* | 9/2007 | Kagawa | G03G 15/0208 |
| | | | 399/315 |
| 2009/0053813 A1 | 2/2009 | Evans | |
| 2011/0203924 A1 | 8/2011 | Wohlstadter et al. | |
| 2016/0029619 A1* | 2/2016 | Sun | G02B 21/32 |
| | | | 435/287.3 |
| 2017/0136452 A1 | 5/2017 | Niles et al. | |
| 2017/0370827 A1 | 12/2017 | Wohlstadter et al. | |
| 2018/0229246 A1* | 8/2018 | Brcka | B03C 5/026 |

* cited by examiner

NON-UNIFORM ELECTRICAL FIELD TO POSITION OBJECTS

BACKGROUND

Analysis of biological material, such as cells, is performed for a variety of applications. Analysis is often performed by isolating a cell, or type of cells, from a tissue sample or a solution sample. Various analysis tasks may then be performed on the isolated cell. The analysis tasks may include a variety of tasks such as, for example, imaging of the cell.

BRIEF DESCRIPTION OF THE DRAWINGS

For a more complete understanding of various examples, reference is now made to the following description taken in connection with the accompanying drawings in which.

DETAILED DESCRIPTION

As noted above, analysis of cells is often performed by isolating a cell, or type of cells, from a tissue sample or a solution sample. Isolation of the cell may be a labor-intensive task with significant inefficiencies. For example, isolation of cells using fluorescence-activated cell sorting (FACS) is generally performed manually by a knowledgeable technician, expensive equipment, and addition of chemical taggants.

Various examples described herein relate to isolation of objects, such as cells in an efficient manner. In one example, a non-uniform electrical field is used to position a single object, such as a cell at a target location within a well, such as at a point on the bottom surface of the well. Electrodes are positioned on a bottom surface of the well to generate the electrical field. The electrodes may be positioned in a concentric formation about the target location. The non-uniform electrical field results in application of forces on the object which direct the object to the target location. In one example, the electrodes are positioned to produce a traveling wave dielectrophoresis (DEP) force from at least two directions. The electrical field may be temporally constant, allowing the non-uniform nature to direct the object to the target location. In some examples, the electrical field may vary temporally, reducing in strength as the object gets closer to the target location, for example. In one example, the electrodes are transparent to allow an imaging device positioned below the well to image an object positioned at the target location.

Figure 1:
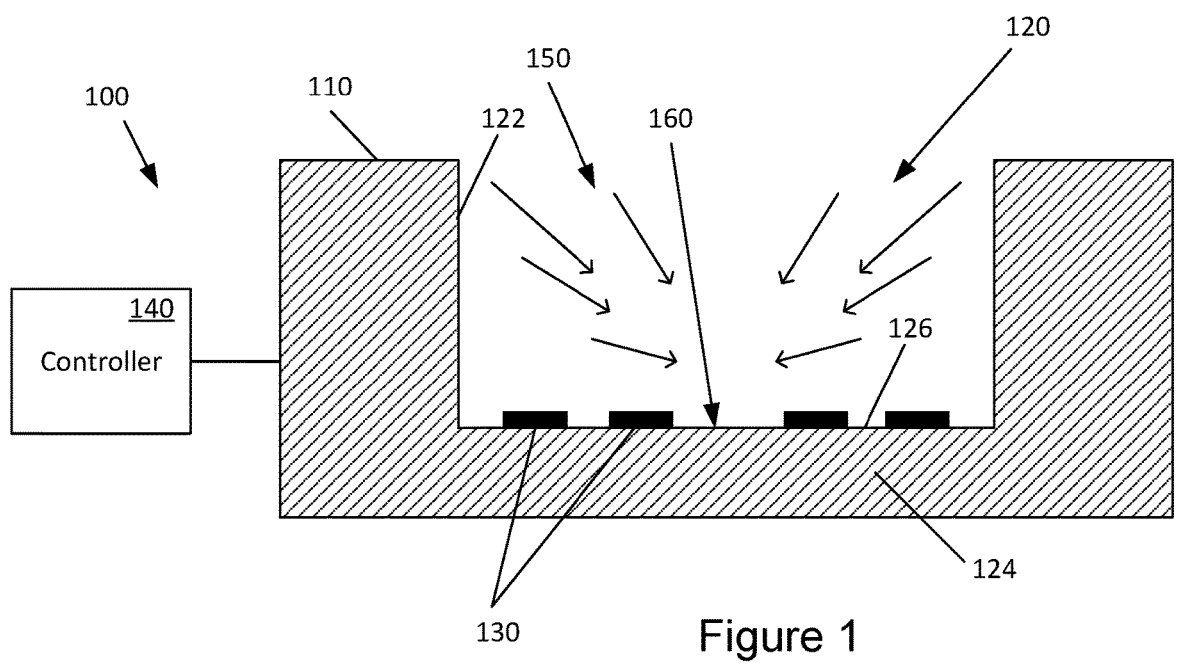
FIG. 1 is a cross-sectional side view of an example apparatus for positioning of objects such as cells.

Referring now to the Figures, FIG. 1 is a cross-sectional side view of an example apparatus 100 for positioning of objects such as cells. The example apparatus 100 of FIG. 1 includes a well plate 110. The well plate 110 may be formed of any of a variety of materials such as, for example, plastics or glasses. In one example, the well plate 110 is formed of a non-reactive material, such as polypropylene. The well plate 110 may be of any practical size according to a desired application. For example, the well plate 110 may be sized to accommodate a specific number of wells.

The well plate 110 of the example apparatus 100 includes at least one well 120. The example apparatus 100 is illustrated with a single well 120. Of course, those skilled in the art will recognize that, in other examples, any number of wells 120 may be provided. The size and shape of the well 120 may be selected from any of a variety of sizes and shapes. In one example, as illustrated in FIG. 1, the well 120 is cylindrical with a cross section that may be circular, rectangular, hexagonal or any of a variety of other shapes. In other examples, the well 120 is conical or other non-cylindrical shape. In one example, the well 120 is a circular cylinder with a diameter of between 1 mm and 100 mm.

In the example system 100, the well 120 is defined by at least one side wall 122 and a bottom floor 124. The example apparatus 100 of FIG. 1 is provided with an array of electrodes 130 positioned on a surface 126 of the bottom floor 124 of the well 120. A controller 140 is provided to direct an electrical voltage to the electrodes 130 from a power source (not shown in FIG. 1). In various examples, the power source is an alternating current (AC) power source. The electrical voltage causes the electrodes 130 to generate an electrical field 150 in the well 120. In various examples, the electrical field 150 is non-uniform, as indicated by the various arrows illustrated in FIG. 1. The non-uniform electrical field 150 is provided to direct an object, such as a cell, in the well 120 to a target position 160 in the well 120. The target position 160 in the illustrated example is on the surface 126 of the bottom floor 124. Directing an object to the target position 160 facilitates various analysis tasks that may be performed including, but not limited to, imaging of the object, picking up of the object by a robotic pick, or the like.

Figure 2:
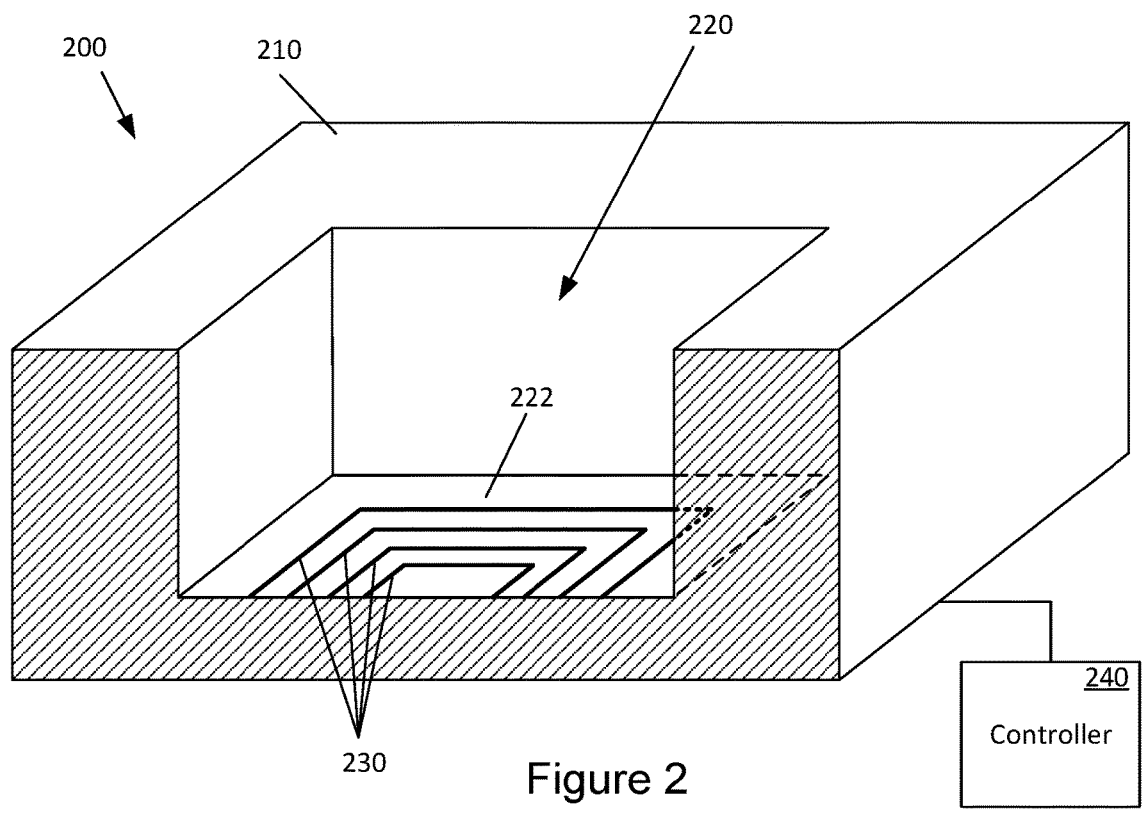
FIG. 2 is a cross-sectional perspective view of another example apparatus for positioning of objects.

Referring now to FIG. 2, a cross-sectional perspective view of another example apparatus 200 for positioning of objects is illustrated. The example apparatus 200 is similar to the example apparatus 100 of FIG. 1 and includes a well plate 210 with at least one well 220. As noted above, the well 220 may have any of a variety of shapes. In the example apparatus 200 of FIG. 2, the well 220 is formed as a rectangular prism with a rectangular bottom surface 222.

The example apparatus 200 is provided with an array of electrodes 230 on the bottom surface 222 of the well 220. As described above, a controller 240 is provided to direct an electrical voltage to the electrodes 230 from an AC power source. The array of electrodes 230 may be positioned in a variety of manners. In certain examples, the electrodes 230 are arranged in a concentric formation. For example, in the example apparatus 200 of FIG. 2, the electrodes 230 are rectangular electrodes arranged concentrically to one another. In other examples, the electrodes may be arranged as concentric circles, concentric hexagons, or the like. In various examples, the concentric arrangement is centered about a target position to which objects are to be directed. The concentric electrodes are arranged to generate an electrical field that is non-uniform and arranged to direct an object, such as a cell, in the well to a target position (e.g., the center of concentricity) in the well 220.

Figure 3:
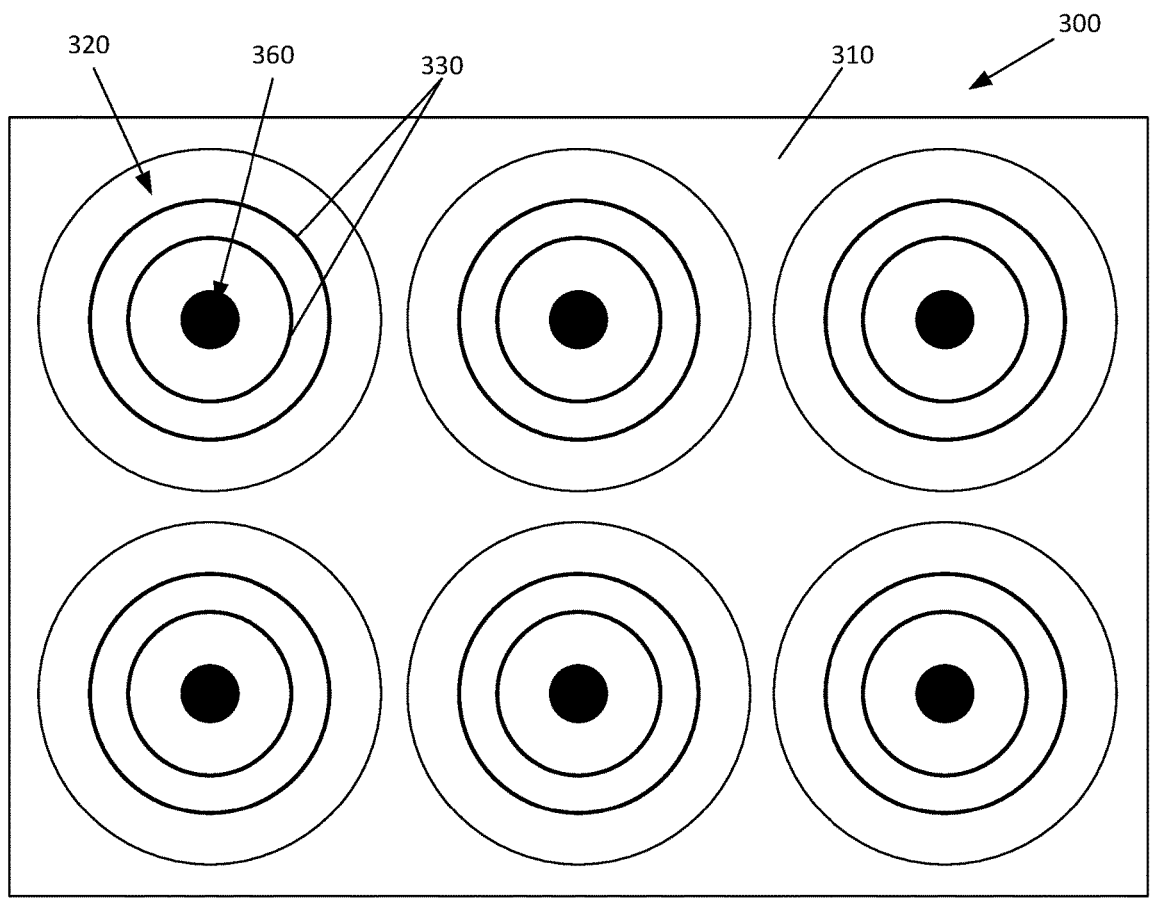
FIG. 3 is a top plan view of another example apparatus for positioning of objects.

Referring now to FIG. 3, a top plan view of another example apparatus 300 for positioning of objects is illustrated. The example apparatus 300 of FIG. 3 includes a well plate 310 with an array of wells, such as well 320. The well plate 310 of the example apparatus 300 is illustrated in FIG. 3 with six wells. As noted above, other examples may include any practical number of wells. The well 320 is formed as a circular cylinder with electrodes 330 formed on the bottom surface of the well 320. As noted above, in various examples, the electrodes 330 are arranged in a concentric manner. In this regard, the example apparatus 300 of FIG. 3 includes electrodes 330 arranged as concentric circles centered about a target position 360.

Figure 4:
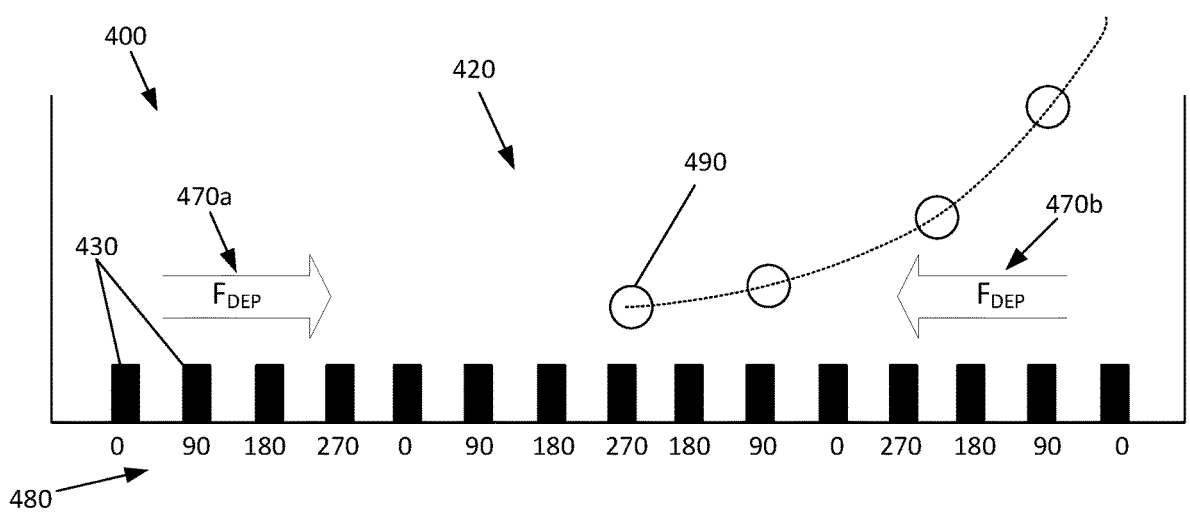
FIG. 4 is a side view of an example apparatus for positioning of objects using an electrical field.

Referring now to FIG. 4, a side view of an example apparatus 400 for positioning of objects using an electrical field is illustrated. The example apparatus 400 of FIG. 4 is illustrated with a well 420 that may be one of multiple wells on a well plate. The well 420 is provided with an array of electrodes 430 on the bottom surface. As described above, a controller (not shown in FIG. 4) may apply an AC voltage to the electrodes 430 to cause the electrodes 430 to generate an electrical field. In various examples, the electrical field generated by the electrodes 430 is at least spatially non-uniform and causes an object to be directed to a target location.

In one example, as illustrated in FIG. 4, the electrical field produces a traveling wave dielectrophoresis (DEP) force in at least two directions, as illustrated by $F_{DEP}$ 470a, 470b in FIG. 4. While electrophoresis moves particles with the particles themselves electrically charged, DEP results in movement of the particles without the need for charges on the particles. Further, while stationary DEP relies on an electrical field from adjacent electrodes having AC voltage at different frequencies, traveling wave DEP may achieve movement of particles with AC voltage applied to electrodes that are spaced apart (e.g., parallel or concentric) with a phase offset. In some examples, phase offset cycles through a 360-degree shift over a number of electrodes, such as four electrodes with adjacent electrodes having a 90-degree phase offset. For example, the traveling wave DEP force may be generated by applying voltage to the electrodes with phase variations, an example of which is illustrated in FIG. 4. In this regard, FIG. 4 illustrates adjacent electrodes being provided with an AC voltage that is out of phase by 90 degrees. The phase variations result in the force in a direction based on the direction of the phase offset. Thus, the particle travels in the direction of the phase variation. In other words, the particle travels where the wave generated by the offset travels. As described in various examples above, the electrodes may be arranged in a concentric manner. In this regard, FIG. 4 illustrates a cross-sectional side view, resulting in the phase profile 480.

FIG. 4 further illustrates an example movement of an object, such as a cell 490, within the well 420. The traveling wave DEP force causes the cell to be directed to a target position in the center of the well 420.

In one example, the voltage applied to the electrodes 430 may be temporally constant. Thus, the electrical field in the well is generated by a temporally constant AC profile applied to the various electrodes 430. Of course, those skilled in the art will appreciate that an alternating current varies within a cycle. In this regard, a "constant" AC voltage refers to a voltage with a constant peak-to-peak voltage. Thus, voltage applied to a specific electrode 430 remains constant over time as the cell 490 moves through the electrical field.

In other examples, the voltage applied to the electrodes 430 may vary in strength over time. In one example, the strength of the electrical field varies over time based on the position of the cell 490. For example, when the cell 490 is first dropped in the well 420 and the cell 490 is furthest from the electrodes, the voltage applied to the electrodes 430 may be high. Thus, even at the greatest distance from the electrodes, the strength of the electrical field is sufficient to affect the cell 490. As the cell 490 gets closer to the electrodes 430, the magnitude of the voltage may be reduced, either incrementally or gradually. In one example, the variation of the magnitude of the voltage may be predetermined and synchronized with a dispenser (not shown in FIG. 4) that drops the cell 490 into the well 420. Thus, when the dispenser is expected to drop the cell 490 into the well 420, the magnitude of the voltage may be high. As the cell 490 is expected to get closer to the electrodes 430, the magnitude of the voltage may be reduced.

In another example, the temporal variation of the voltage applied to the electrodes 430 may include variations in the phase profile 480. In this regard, when the cell 490 is first dropped into the well 420, the phase profile 480 may be adjusted such that neighboring electrodes have a 180-degree offset in phase. The 180-degree phase offset facilitates pulling down of the cell 490 from the top of the well towards the electrodes 430 on the bottom surface of the well 420. When the cell 490 has been pulled down to a desirable height, the phase profile 480 may be changed to provide a 90-degree phase offset between neighboring electrodes, as illustrated in FIG. 4, thus creating a traveling wave DEP force to direct the cell 490 toward the center of the well 420.

Figure 5:
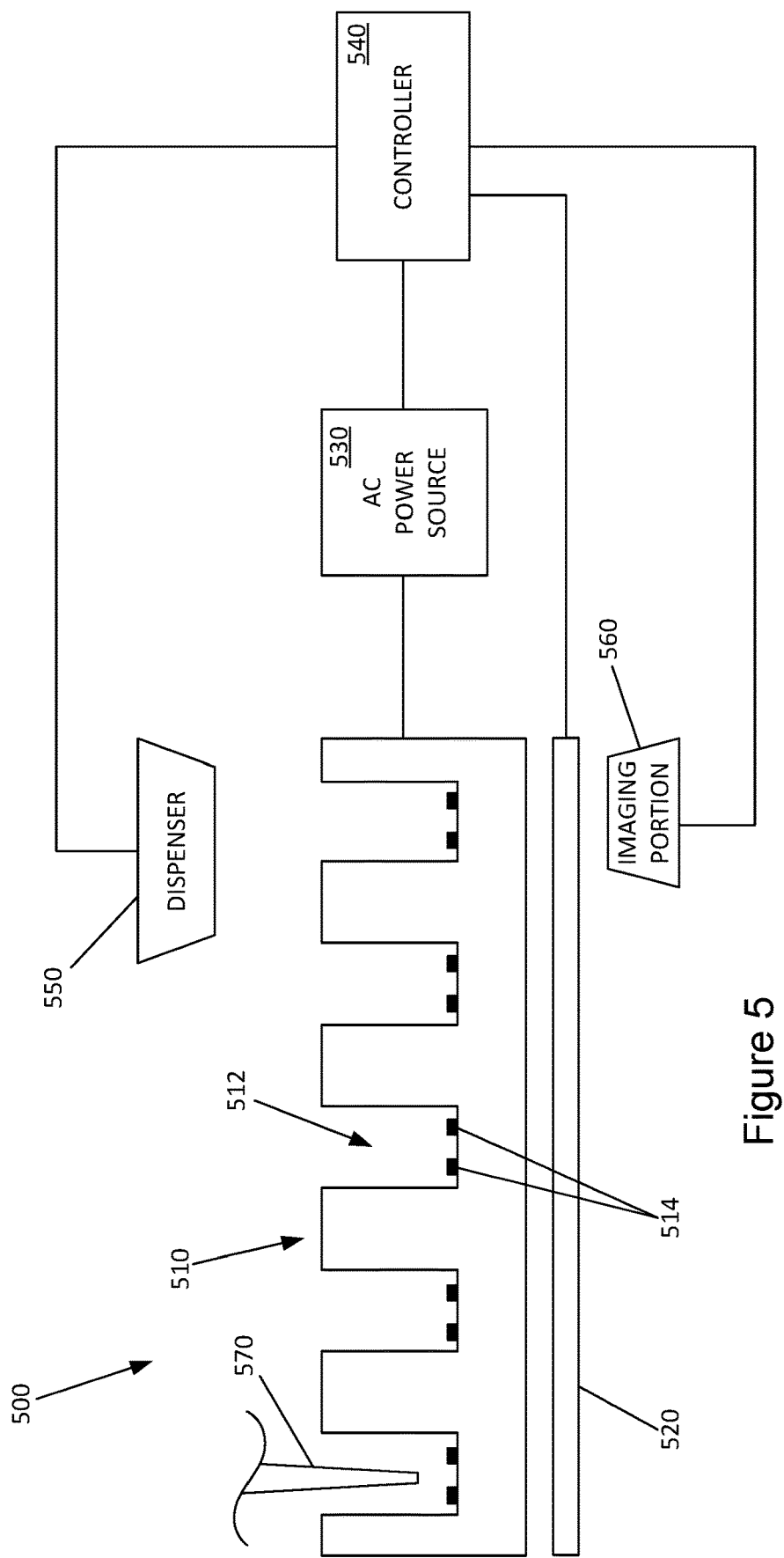
FIG. 5 illustrates an example system for positioning and imaging of objects.

Referring now to FIG. 5, an example system 500 for positioning and imaging of objects is illustrated. The example system 500 of FIG. 5 includes a well plate 510 with wells, such as well 512. The well plate 510 of the example system 500 is positioned on a movable stage 520. The movable stage 520 may be movable in at least two directions to position the well plate 510 relative to various other components of the example system 500 as described below. In this regard, the movable stage 520 may be sufficiently large to support the well plate 510.

Each well 512 is provided with an array of electrodes 514 formed on the bottom surface of the well. As described above, in various examples, the array of electrodes 514 may be arranged in a concentric manner. The electrodes 514 may be provided with a voltage from an AC power source 530.

The AC power source 530 is coupled to a controller 540. The controller 540 selectively provides voltage from the AC power source 530 to the electrodes 514 in each well 512 of the well plate 510. As described above, the voltage from the AC power source 530 provided to the electrodes generates a non-uniform electrical field. The non-uniform electrical field may direct an object, such as a cell, to a target position on the bottom surface of the well. In various examples, the non-uniform electrical field may be arranged to generate a traveling wave DEP force to direct the object.

The controller 540 of the example system 500 is also coupled to the movable stage 520. The controller 540 may selectively move the movable stage 520 relative to various other components of the example system 500. In this regard, the example system 500 of FIG. 5 includes a dispenser 550, an imaging portion 560 and a robotic pick mechanism 570. The dispenser 550 is provided to drop, or inject, objects such as cells into the various wells 512 of the well plate 510. In various examples, the dispenser 550 may be provided to drop a single cell at a time. The controller 550 may be coupled to the dispenser 550 and may coordinate the movement of the movable stage 520 and the timing of dropping of the cell from the dispenser 550 to drop the cell into a desired, or selected, well 512 in the well plate 510.

In some examples, the dispenser 550 may inject or drop additional material into the wells 512. For example, the dispenser 550 may be used to add stimuli onto cells already in the wells 512 to facilitate a reaction or other response that may be observed or imaged. In other examples, the dispenser 550 may add fluorescent dyes or other stains to facilitate the imaging.

The imaging portion 560 is positioned under the bottom surface of the well 512. The imaging portion 560 is coupled to the controller 540. Thus, the controller 540 may coordinate the movement of the movable stage 520 and the operation of the imaging portion 560 to image an object in a selected well 512. To facilitate the imaging, the electrodes 514 on the bottom surface of each well 512 are formed as transparent electrodes which allow the imaging portion 560 to image an object in the well through the electrodes 514. In some examples, the electrodes 514 may be formed of a thin metal that is sufficiently thin to allow imaging of the object by the imaging portion 560. In various examples, the thin metal has a thickness of less than 100 nm. In other examples, the electrodes 514 are formed of a transparent material, such as indium tin oxide. In one example, the electrodes 514 are formed of a layer of indium tin oxide with a thickness of between 5 and 500 nm.

The robotic pick mechanism 570 is provided to selectively remove an object, such as a cell, from the well 512. In some examples, the controller 540 may align a selected well 512 of the well plate 510 with the robotic pick mechanism 570. Thus, the robotic pick mechanism 570 may then pick up an object from within the well 512. The operation of the robotic pick mechanism 570 is facilitated by the positioning of the cell at a target location by the electrical field, as described above. For example, the robotic pick mechanism 570 can be positioned with more precise knowledge of the location of the cell to be picked. In this regard, operation of the robotic pick mechanism 570 may be automated and may be achieved with little or no manual intervention.

Figure 6:
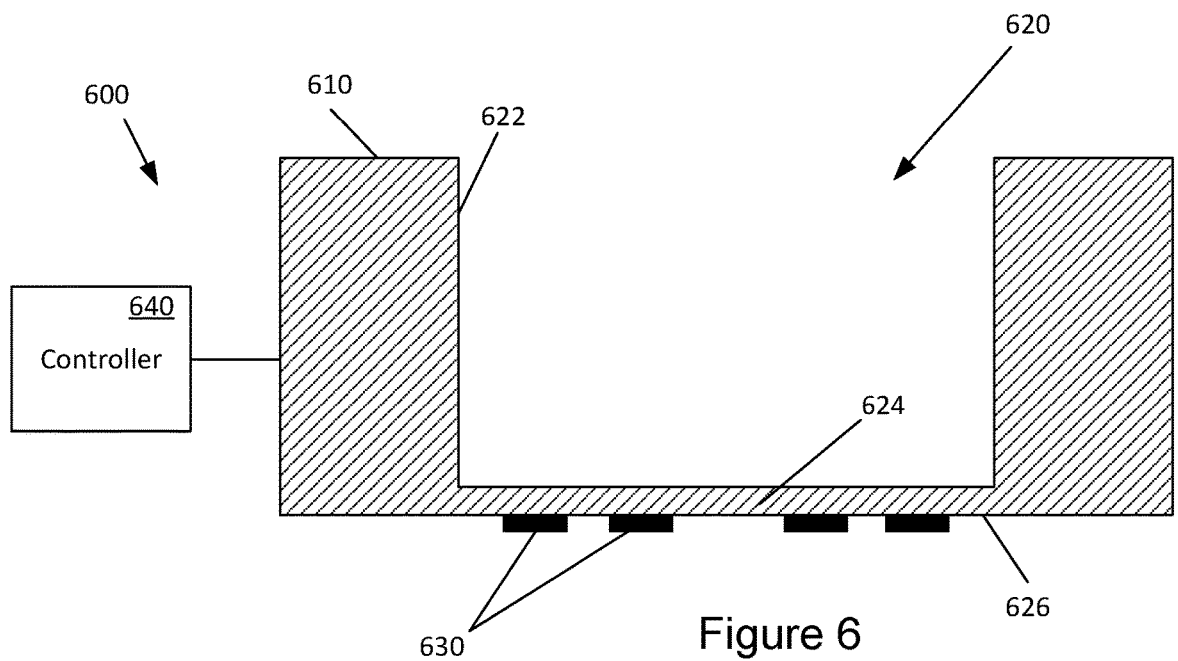
FIG. 6 illustrates a cross-sectional side view of another example apparatus.

The various examples described above illustrate electrodes provided on an inside surface of the bottom floor of a well. For example, FIG. 1 illustrates electrodes 130 provided on the inside surface 126 of the bottom floor 124 of the well 120. In other examples, the electrodes may be provided on an outside surface of the bottom floor of the well. For example, FIG. 6 illustrates a cross-sectional side view of another example apparatus 600. The example apparatus 600 of FIG. 6 is similar to the example apparatus 100 of FIG. 1 and includes a well plate 610, a well 620, electrodes 630 and a controller 640.

In the example system 600, the well 620 is defined by at least one side wall 622 and a bottom floor 624. In the example of FIG. 6, the electrodes 630 are provided on an outer surface 626 of the bottom floor 624. In this regard, the voltage applied to the electrodes 630 should be proportionately increased relative to the thickness of the bottom floor 624 to provide an electrical field with sufficient strength.

Figure 7:
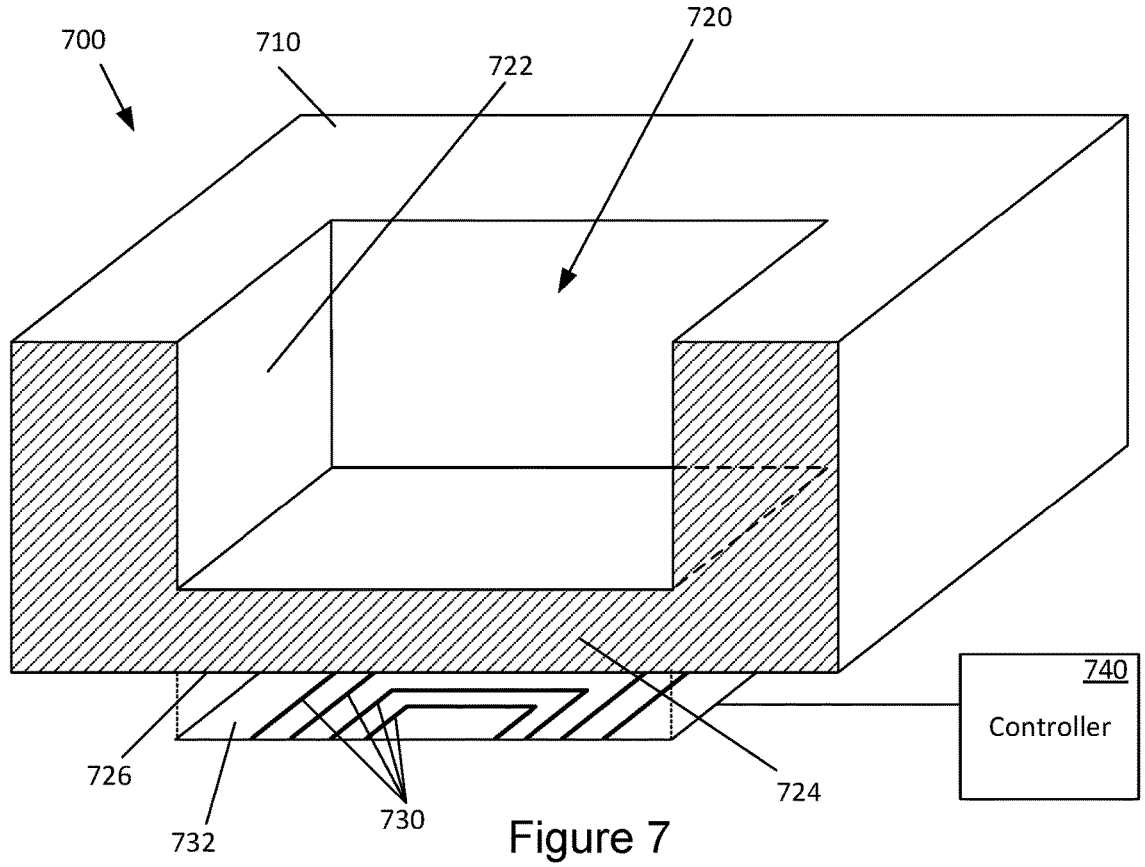
FIG. 7 illustrates a cross-sectional perspective view of another example apparatus.

Referring now to FIG. 7, a cross-sectional perspective view of another example apparatus 700 is illustrated. The example apparatus 700 is similar to the example apparatus 200 of FIG. 2 and includes a well plate 710 with at least one well 720 and a controller 740. The well 720 is formed as a rectangular prism with walls 722 and a rectangular bottom floor 724.

The example apparatus 700 is provided with an array of electrodes 730 formed on a board 732, such as a printed circuit board, for example. The printed circuit board may be removably attached to an outer surface 726 of the bottom floor 724 of the well 720. In this regard, a low-cost well plate with wells may be provided with electrodes to generate a non-uniform electrical field, as described above.

Thus, the example systems described above provide an efficient, cost-effective and user-friendly systems and apparatus for isolation of objects such as cells. The isolated cells may then be accurately imaged and/or removed from the system (e.g., the well of a well plate) in an automated manner.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An apparatus, comprising:
a well plate having at least one well;
an array of electrodes positioned on a surface of a bottom floor of the well; and
a controller to direct electrical voltage to the electrodes to generate a non-uniform electrical field, the electrical field to direct an object in the electrical field to a target position in the well, the controller to vary a magnitude voltage applied to the array of electrodes over time such that the magnitude of the voltage is reduced as the object approaches the target position in the well.

2. The apparatus of claim 1, wherein the array of electrodes includes electrodes arranged in a concentric formation.

3. The apparatus of claim 1, wherein the electrodes are transparent.

4. The apparatus of claim 3, further comprising:
an imaging portion positioned under the bottom floor of the well, the imaging portion to image the object through the electrodes.

5. The apparatus of claim 3, wherein the electrodes are formed of indium tin oxide.

6. The apparatus of claim 1, wherein the electrical field is generated by an alternating current.

7. The apparatus of claim 1, wherein the electrodes are positioned on an inside surface of the bottom floor of the well.

8. The apparatus of claim 1, wherein the electrodes are positioned on an outside surface of the bottom floor of the well.

9. A system, comprising:
a well plate including at least one well;
an array of electrodes formed on a bottom surface of the well;
an alternating current (AC) power source coupled to each electrode in the array of electrodes;
an imaging portion positioned under the bottom surface of the well; and a controller to:

apply voltage from the AC power source to the electrodes to generate a non-uniform electrical field, the non-uniform electrical field being to direct an object in the well to a target position on the bottom surface of the well, the controller to vary a magnitude of the voltage applied to the electrodes over time such that the magnitude of the voltage is reduced as the object approaches the target position in the well; and operate the imaging portion to image the object through the electrodes, the electrodes being transparent to the imaging portion.

10. The system of claim 9, further comprising:

a movable stage, the well plate being positioned on the movable stage, wherein the controller is to move the movable stage to selectively align a selected well of the well plate with the imaging portion.

11. The system of claim 9, further comprising:

a robotic pick mechanism, the controller to align a selected well of the well plate with the robotic pick mechanism, the robotic pick mechanism being to pick up the object from within the well.

12. An apparatus, comprising:

a well plate having at least one well;

an array of electrodes positioned on a bottom surface of the well; and a controller to direct electrical voltage to the electrodes to generate an electrical field, the electrical field to produce a traveling wave dielectrophoresis (DEP) force in at least two directions, the DEP force being to direct an object in the well to a target position in the well, the controller to vary a magnitude of the direct electrical voltage over time such that the magnitude of the voltage is reduced as the object approaches the target position in the well.

* * * * *